WILLIAM A. BROYLES, JR.
INVENTOR

BY
AGENT

WILLIAM A. BROYLES, JR.
INVENTOR

BY

AGENT

United States Patent Office 3,439,263
Patented Apr. 15, 1969

3,439,263
IONIC CURRENT PROXIMITY GAGE
William A. Broyles, Jr., Dallas, Tex., assignor to LTV Aerospace Corporation, Dallas, Tex., a corporation of Delaware
Continuation-in-part of application Ser. No. 439,261, Mar. 12, 1965. This application July 3, 1968, Ser. No. 742,434
Int. Cl. G01n 27/62
U.S. Cl. 324—33      7 Claims

ABSTRACT OF THE DISCLOSURE

A proximity gage in which a microammeter is employed to measure the flow of DC current across an air gap in the range wherein current flow is inversely proportional to the proximity of a probe with respect to another element in the electrical circuit.

---

This application in part discloses and claims subject matter disclosed in co-pending application Ser. No. 439,261 filed Mar. 12, 1965, which is now abandoned.

This invention relates generally to instruments in the nature of proximity gages or detectors useful for sensing the position of elements without physical contact by a probe. More particularly, the invention relates to means for measuring ionic current flow across an air gap between two electrically conductive elements and for converting the current into a linear measure of said air gap.

Many machines are in use today that employ extremely delicate tools to pass current, remove metal, etc. For example, small drills having a conventional configuration but having a diameter of only 0.003 inch are readily available, as are equally small ultrasonic tools, electrical discharge tools, etc. Installation of such small tools in machines can pose a major problem, because a very slight eccentricity in a drill, or a slightly skewed orientation in an ultrasonic tool, etc., can quickly turn a valuable workpiece into scrap. The human eye is not reliable enough to judge the trueness of a rapidly rotating tool whose diameter is on the order of 0.003 inch, unless the tool is so far out of alignment as to be unreasonably skewed. Furthermore, contact gages for checking location or inclination of many small tools are impractical because the tools are so easily deflected. In fact, workers who install miniature ultrasonic tools must use a shield to prevent their breath from striking the tools, because merely breathing on the tools in a normal manner from a distance of one foot or so can cause the tools to flutter uncontrollably. It will be seen therefore that there exists a need for a means for measuring the proximity of the surface of a tool without actually making contact with the tool and without causing damage to the tool surface as a result of arcing or the like.

The gage of this invention satisfies the aforementioned need by measuring the stable flow of ionic current across an air gap between a probe and an electrically conductive tool or work piece being examined, and for converting the current flow into a linear measurement of said air gap. To this end, a high-voltage, direct-current power supply is provided, together with a resistance which is sufficient to preclude a spark from crossing the air gap. If the air gap is small enough, there will be a flow of ionic current across the air gap in the nature of a visible corona discharge, which flow is inversely proportional to the width of the air gap. The ionic current is readily measured by a microammeter inserted in series with the air gap, and direct readings in thousandths of an inch can be conveniently made.

Having briefly described the invention, it will be apparent that it is a major object of the invention to provide a proximity gage which is useful for measuring air gaps between electrically conductive members.

Another object is to provide a means for determining the orientation of a tool or the like without physically contacting the tool.

A further object is to provide a proximity gage for determining the proximity to a delicate tool that is easily deflected from its normal operative position.

Other objects and advantages will be apparent from the specification and claims, and from the accompanying drawing illustrative of the invention.

In the drawing,
FIGURE 1 is a diagrammatic view of an apparatus for measuring the flow of ionic current across a small air gap between two electrically conductive elements;

Figure 1:
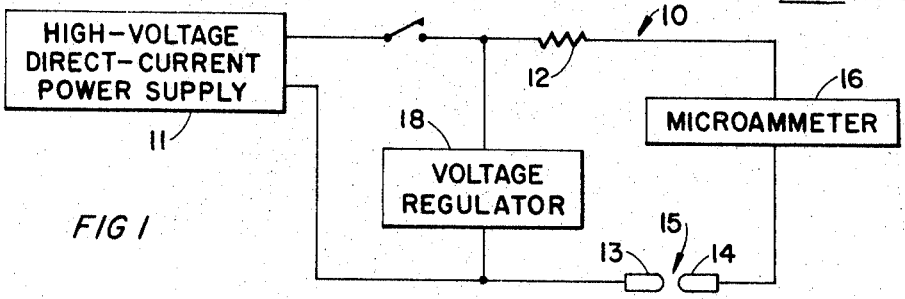

With initial reference to FIG. 1 it has been found that an electrical circuit 10 which includes a small air gap 15 and which is subjected to a sufficiently high potential will have a flow of ionic current across the air gap which is inversely proportional to the magnitude of the air gap. The linear relation between air gap width and current flow is only valid, however, as long as sparks or arcs are precluded, i.e., as long as the current is below avalanche current. Hence a large resistor 12 must be included in series with the air gap, the value of said resistor being selected after consideration of the voltage of the power supply being used and the size of the gap which normally is to be measured.

In FIG. 1, the circuit 10 includes a voltage-regulated, direct-current power supply 11, which typically is capable of providing power at a voltage in excess of about 500 volts. The power supply 11 may be of a conventional rectifier filter type connected to an integral or external voltage regulator 18. An upper limit for the voltage of the power supply 11 has not been, and possibly never will be, conclusively established, since any new large power supply can probably be accommodated by providing, as explained hereinafter, a new large resistor 12. Experiments, however, have been carried out with various power supplies producing around 2,500 volts, and the linearity which is characteristic of the circuit 10 is just as dependable at 2,500 volts as at, say, 1,000 volts.

An electrically conductive element 13 is connected to a first terminal of the power supply, and a probe 14 (also electrically conductive) is connected to the power supply second terminal. The second terminal is charged oppositely to the first terminal, of course; but, so far as has been determined, it is immaterial whether or not the probe 14 is at a positive or a negative potential as a result of its connection to the power supply 11. The probe 14 is adapted to be placed near the electrically conductive element 13 so as to establish a very small air gap 15 between the two bodies. The gap 15 is made small enough such that passage of ionic current across the air gap is established, said current being conveniently read with a microammeter 16.

Figure 4:
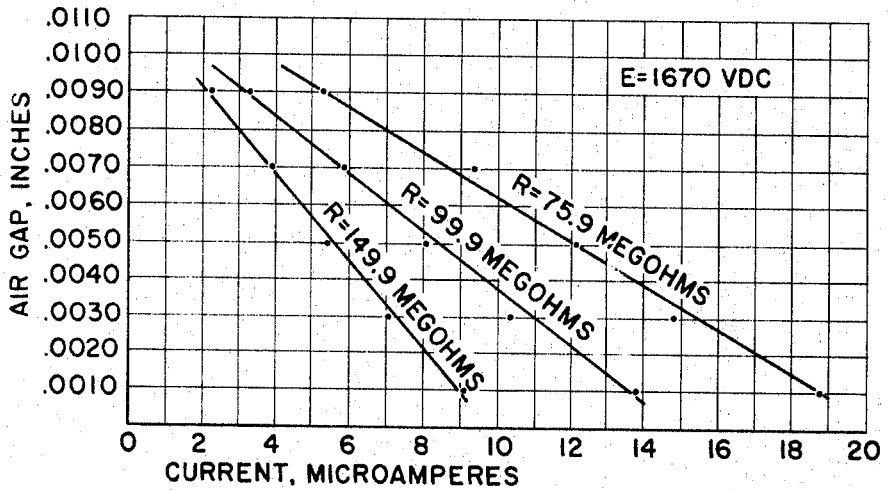
FIGURE 4 is a plot of air gap distance versus the flow of ionic current across the air gap for a constant voltage and three separate resistors.

The air gap 15 obviously has an effective resistance which is proportional to its size. Air being a reasonably good insulator, the resistance of the air gap may be from a few to several hundred megohms. The current-limiting resistor 12, which is connected in series with the probe 14, is selected such that its resistance is sufficient (when combined with the effective resistance of the air gap) to limit the flow of current across the air gap 15 to microamperes and to preclude a spark from traversing the air gap. A typical value for the resistor 12, when the air gap to be measured is less than 0.010 inch and the power supply voltage is about 1,500 volts, is about 150 megohms. Results which can be obtained by varying the value of the resistor 12 can be predicted by reference to FIG. 4 which will be described hereinafter.

Figure 2:
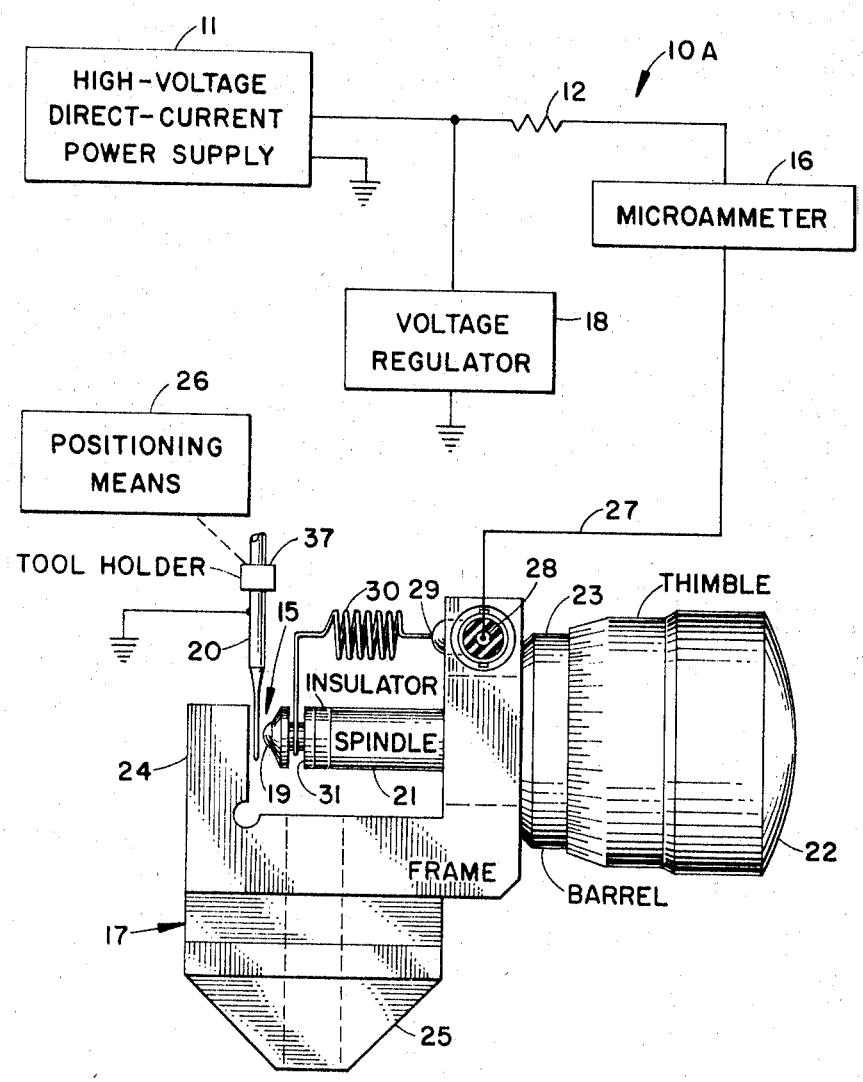
FIGURE 2 is an example of the apparatus of FIG. 1 in combination with a micrometer.

An alternate embodiment of the invention is presented in FIG. 2, wherein an electrical circuit 10A like that shown in FIG. 1 is combined with a micrometer 17. One terminal of the power supply 11 and one terminal of the voltage regulator 18 are connected to a ground return. The other terminals of the power supply 11 and voltage regulator 18 provide a positive potential to the metering circuit of this embodiment of the invention. The positive terminal of the power supply 11 is connected through resistor 12 and microammeter 16 to an insulated electrode 19, said electrode corresponding functionally to the aforementioned probe 14 of FIG. 1. The electrode 19 ideally has a smooth, rounded surface, as indicated in the drawing.

A convenient means for accurately positioning the electrode 19 adjacent a surface of an electrically conductive member 20 is the micrometer apparatus 17, which includes a spindle 21 that carries the electrode, and a thimble 22 and a mating barrel 23 for measuring the position of the electrode relative to the frame 24. A pyramid 25 facilitates locating the frame 24 with respect to a machine, such as an ultrasonic cutting machine, by virtue of the pyramid's capability of mating with a V-block on the machine. The electrically conductive member 20 can be practically anything desired, including workpieces; but it is illustrated in the figure as representing an ultrasonic cutting tool. (By comparison of the two figures, it will be apparent that tool 20 in FIG. 2 corresponds to the element 13 in FIG. 1.) As explained earlier, such cutting tools are delicate and very susceptible to deflection, as a result of vibration, vigorous air currents, etc. It has been found, however, that the electrical potential established across the air gap 15 does not cause the thin ultrasonic cutting tool 20 to be attracted toward the elecrode 19; hence, the rigidity of the tool 20 itself does not affect the operation of the invention, although a rigid mounting for the tool will obviously increase accuracy. A positioning means 26 typically moves a tool holder 37 which in turn moves the tool 20 as it descends with respect to the electrode 19.

The electrical conductor 27 that serves to connect the micro ammeter 16 to the electrode 19 must be well insulated against leakage. Since the electrode 19 in this embodiment is movable, an arrangement such as that shown in FIG. 2 is desirable to facilitate the required relative movements. The frame 24 has insulated terminals 28, 29 that are interconnected within the frame. The terminal 29 is mounted in line with and above the spindle 21 to facilitate conecting a conductive spring 30 between the terminal 29 and a groove 31 in electrode 19.

In operation of the embodiment shown in FIG. 2, the pyramid 25 is placed in the V-block of a machine that is to be set up for a desired cutting operation. The thimble of the micrometer 17 is adjusted until the electrode 19 has its exposed surface adjacent the plane in which the tool 20 is expected to descend. As the tool 20 is lowered by the positioning means 26, the air gap 15 between the tool 20 and electrode 19 will remain constant if the tool descends in a plane perpendicular to the axis of the electrode 19. If the tool 20 is skewed, the air gap 15 will increase or decrease (depending on which way the tool is skewed) as it is lowered past the electrode 19. When the size of air gap 15 changes, the effective resistance of the air gap correspondingly changes, and hence the flow of ionic current across the air gap will change. Consequently, the needle on the microammeter 16, will deflect, thereby showing that the tool 20 is skewed. It should be noted that in this example, there is no need to know what the gap is, i.e., whether the gap is 0.002 or 0.012 inch. In other words, a constant indication on the meter 16 as the tool 20 is lowered shows that the vertical surface of the end of the tool facing the electrode 19 is exactly perpendicular to the longitudinal axis of the spindle 21, regardless of the size of the gap.

In a similar arrangement, if the tool 20 is a drill, and a chuck rotates the drill (without moving it up or down with respect to the electrode 19), a constant reading on the microammeter 16 as the drill rotates will reveal that the drill is properly seated and is not bent. It should be emphasized, perhaps, that the electrode 19 does not touch the tool 20 at any time. Thus, the apparatus disclosed herein is intended to measure the proximity—not contact—of two electrically conductive elements.

After a satisfactory set-up of the tool 20 has been verified, the described apparatus may be removed from the machine until it is needed at some later time, or it may be left in place so as to monitor the tool as it engages a workpiece. Furthermore, the workpiece itself may be monitored, as for example, when metal is being removed from a cylindrical object in a metal lathe. In such an arrangement it will be apparent that electrically speaking, the workpiece would constitute merely an extension of an electrically conductive element 13.

If it is not sufficient to know merely that a given tool 20 is not properly aligned, but rather it is desired to know how much it is out of alignment, then some correspondence must be established between readings on the microammeter 16 and the size of the air gap 15. This is initially accomplished, with a microammeter of any type or manufacture by merely measuring known gaps and making marks on the dial face of the microammeter which correspond to the known gaps. Having once calibrated the microammeter 16 with one or more known gaps 15, and created a dial face that reads in inches instead of microamps, the apparatus becomes what is more readily recognizable as a proximity gage. Since the needle of a conventional microammeter will sweep from left to right with increasing current flow, a high gap distance will be marked on the left of such a dial; correspondingly, low gap distances will be marked on the right of the dial face, because currents are larger with small gaps. Hence, gap distances will increase from right to left in an ordinary microammeter adapted for use as a proximity gage. This may be slightly awkward since most people are accustomed to seeing needles move to the right with increasing numbers. Therefore, employing a microammeter with a reverse movement is an optional variation to make the dial readings vary in the direction to which most people are accustomed.

The inherent measuring capability of the micrometer 17 can be advantageously employed as often as is desired to verify that the microammeter 16 is reading correctly. Continued use of the microammeter alone will usually increase reliance on it, however, so that the micrometer will likely be considered a luxury rather than a necessity, eventually. The micrometer 17 can also be used in some cases to effect a duplicate measurement of an air gap in actual working conditions, if desired, if contact between the electrode 19 and the piece being examined would not likely cause the piece to deflect, be scratched, etc.

Figure 3:
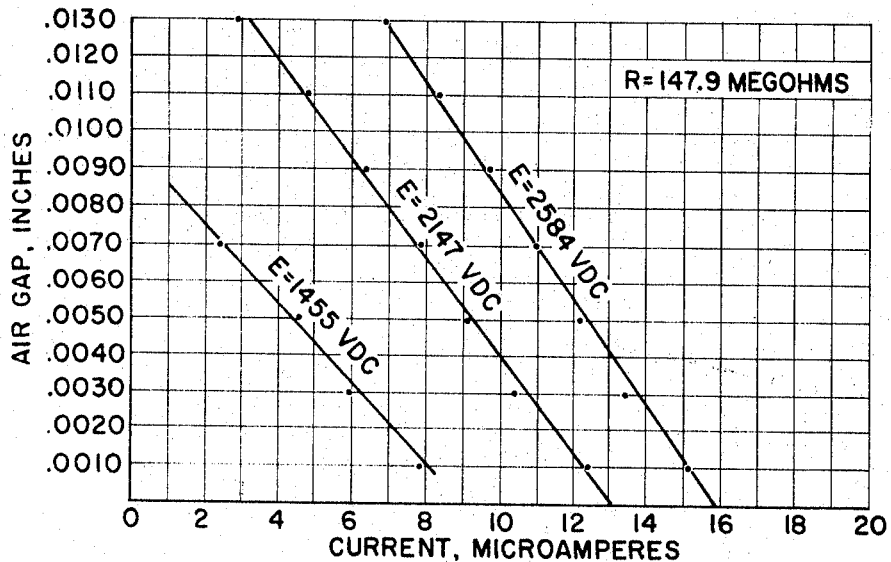
FIGURE 3 is a plot of air gap distance versus the flow of ionic current across the air gap for three constant voltages.

Since it is known that dial-indicating instruments are more accurate in their mid-region than near their ends, a judicious selection of voltage and external resistance can be made to place an air gap which is to be monitored exactly in the middle of the microammeter scale. With reference to FIG. 3, it can be seen that a voltage of about 1,500 volts will permit measurement of air gaps up to about 0.010 inch, while a voltage of about 2,500 volts will permit measurement of gaps of about 0.020 inch. Once an air gap range has been established in accordance with the needs of a given situation, a microammeter is selected that will accommodate the current flow which can be expected.

Figure 5:
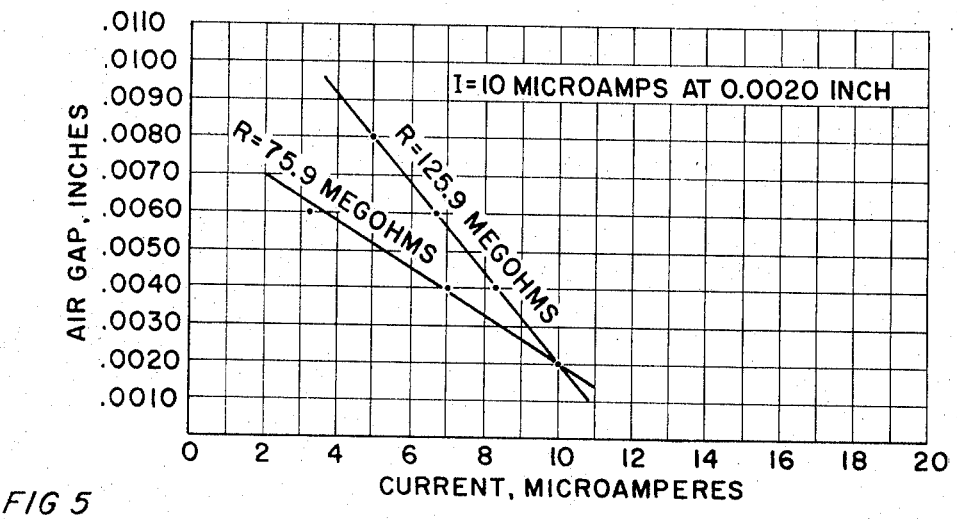
FIGURE 5 is a plot of air gap distance versus the flow of ionic current across the air gap for two resistor values wherein the current flow is identical in the two circuits for one gap distance.

For a given voltage, e.g., about 1,700 volts, the resistance which is external of the air gap 15, (i.e., the resistance of resistor 12), can affect the accuracy of the readings obtained by compressing or extending the range of current values corresponding to a given air gap increment. Thus, low resistances permit examination of a given air gap over a wider range of current flow than do high resistances, if all other parameters are fixed. The effect of resistor values in the circuit 10 can be seen in FIGS. 4 and 5. Examination of FIG. 3 might lead one to suspect that there is a lower limit to the voltage which will produce the desired relationship between air gap and current. In fact, this has been experimentally determined to be true. Thus, it has been found that if the power supply does not provide at least 500 volts, a stable flow of current across the gap is not established.

The flow of current across an air gap theoretically should be dependent on the variables that are characteristic of atmospheric air, including pressure, temperature, and relative humidity. In practice, however, any change that occurs in microammeter readings as a result of physical changes in the air has been found to be so small as to be negligible. Hence, these factors have not imposed a limitation on the use of the invention in any way.

Figure 6:
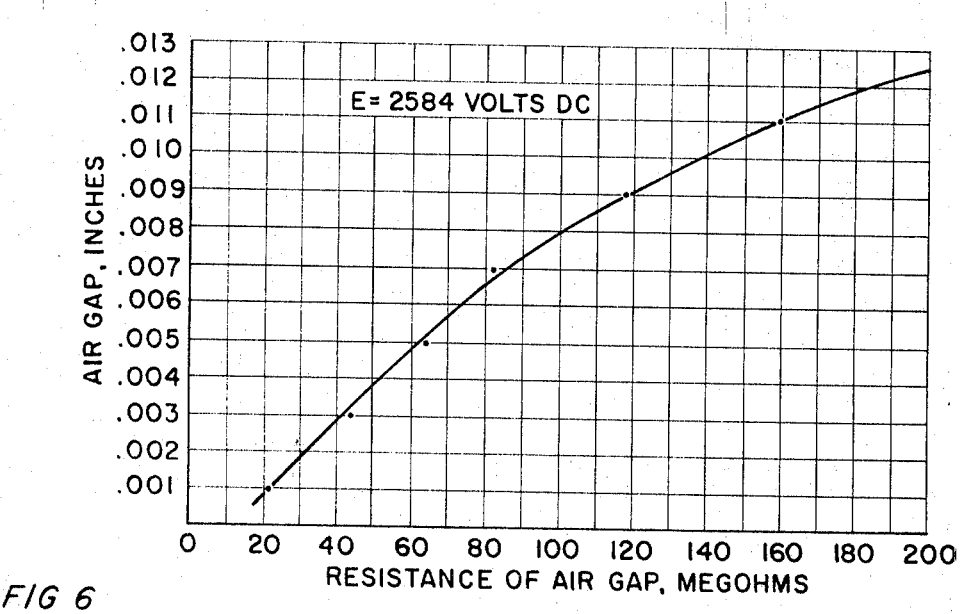
FIGURE 6 is a plot of air gap distance versus effective air gap resistance.

To obtain an approximate idea of the resistance of an air gap, as a step in the process of selecting a limiting resistor to include in the circuits 10, 10A, FIG. 6 can be consulted. Data for this figure was obtained from the same experimental results from which a portion of FIG. 3 was plotted, said portion being that for 2,584 volts D.C. By ascertaining the approximate resistance of the air gap which is to be monitored, the value of the external resistor 12 can be determined which will be required to make the circuit operable in accordance with Ohm's law to give the desired current.

A pronounced advantage of this invention is that there is no spark discharge or arcing which might cause discoloration or other damage to the surface being examined. Accordingly, very sensitive surfaces can be charted, much like what has been done with a profilometer, except that there need be no phyical contact by a tracing point with the surface. All that is required is that a recording device be combined with the circuit of FIGS. 1 or 2 so as to make a permanent record of the current variations when a probe or the like moves with respect to the surface being inspected. While they enlarge the potential usefulness of the circuits described herein appreciably, such recording devices are well known in connection with other, unrelated uses; hence they are not described herein.

What is claimed is:

1. An instrument for electrically measuring small distances, comprising:
   a voltage-regulated direct-current power supply for providing power at a voltage in excess of about 500 volts;
   an electrically conductive element connected to a first terminal of the power supply;
   a probe connected to a power supply second terminal which is charged oppositely to the first terminal, the probe being adapted to be placed near the electrically conductive element so as to establish a very small air gap having an effective resistance;
   a microammeter connected in series with the probe for measuring the flow of ionization current across the air gap; and
   a limiting resistor connected in series with the probe and having sufficient resistance so that, when combined with the effective resistance of the air gap, the flow of current across the air gap is limited to microamperes and a spark across the air gap is prevented.

2. The instrument claimed in claim 1 and further including a recording device for making a permanent record of the variations in current that occur as a result of a change in the size of the air gap.

3. The instrument recited in claim 1 where in the voltage maintained by the power supply is about 2,500 volts and the air gap is about 0.020 inch or less.

4. A proximity gage for determining the distance of an electrically conductive member from a portion of the gage, comprising:
   a high-voltage direct-current power supply;
   a microammeter;
   an insulated electrode having an exposed, arcuate surface;
   means for accurately positioning the arcuate surface of said electrode adjacent a surface of the electrically conductive member so that a small air gap exists between the adjacent surfaces thereof;
   a resistor serially connected with said power supply, said microammeter, and said air gap to form an electrical circuit, said resistor having sufficient resistance to prevent a spark across the air gap, and said air gap being small enough to insure the passage of ionic current through said circuit such that the flow of current as indicated by said microammeter is inversely proportional to the separation of said adjacent surfaces, whereby a decreasing distance across said air gap provides an increasing current indication on said microammeter.

5. A proximity gage for accurately locating an electrically conductive member with respect to a spaced portion of the gage, comprising:
   an electrode;
   positioning means for positioning said electrode and said electrically conductive member adjacent each other across an air gap;
   power supply means connected to said electrode and to said conductive member for establishing in said air gap a limited ionic current below avalanche current between said electrode and said conductive member; and
   means connected in series with said air gap to measure said current, which is indicative of the location of said conductive member with respect to said electrode.

6. A gage as set forth in claim 5, wherein said positioning means includes a frame and a micrometer apparatus for moving said electrode wtih respect to said frame, said micrometer apparatus having a spindle which carries the electrode, and having a thimble and a mating barrel for measuring accurately the position of said electrode relative to said frame.

7. A gage as set forth in claim 5, wherein said power supply means includes a high-voltage, direct-current power source, and further includes a limiting resistor in series therewith for preventing a spark in the air gap between said electrode and said conductive member.

References Cited

UNITED STATES PATENTS

| 2,005,887 | 6/1935 | Carson | 324—71 X |
| 2,752,690 | 7/1956 | Heath et al. | 324—71 X |
| 3,339,125 | 8/1967 | Almy. | |

RUDOLPH V. ROLINEC, *Primary Examiner.*

C. F. ROBERTS, *Assistant Examiner.*

U.S. Cl. X.R.

324—71, 149; 33—172; 340—258, 265, 282